3,284,457
1-LOWER ALKYL-4-SUBSTITUTED PHENYL-1,2,3,6-TETRAHYDROPYRIDINES AND ACID ADDITION SALTS
Helmut Beschke, Frankfurt am Main, and Wilhelm Alfons Schuler, Bad Homburg von der Hohe, Germany, assignors to Deutsche Gold- und Silber-Scheideanstalt vormals Roessler, Frankfurt am Main, Germany
No Drawing. Filed Jan. 8, 1965, Ser. No. 424,194
Claims priority, application Germany, Jan. 17, 1964,
D 43,367
3 Claims. (Cl. 260—290)

The present invention relates to novel substituted phenyltetrahydropyridines of the formula:

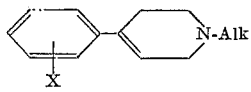

wherein X is a halogen atom, such as F, Br and preferably chlorine or a trifluoromethyl group in position 2, 3 or 4 and Alk is an alkyl group of 1 to 6 carbon atoms and preferably methyl and their acid addition salts with pharmaceutically acceptable acids, that is, acids having pharmaceutically acceptable anions as well as a method of their preparation.

The compounds possess valuable pharmaceutical properties and are especially suited as anthelmintics for use in veterinary medicine.

The compounds in question can be produced by dehydrating tertiary alcohols of the formula

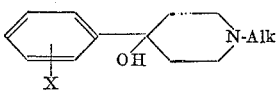

wherein X and Alk have the same significance as above in the presence of dehydrating agents under known dehydrating conditions. Expediently such dehydration is effected according to the dehydrating agent at room temperature or at an elevated temperature up to about 200° C. and in the presence of a solvent, such as chloroform, toluene, glacial acetic acid and the like.

Dehydrating agents, such as, for example, acetic acid anhydride, acetyl chloride, thionyl chloride, toluene sulfonic acids, sulfuric acid or aluminum oxide, calcium chloride, alkali metal hydroxides and the like can be used for the dehydration reaction.

The salts can be prepared from the free bases by treatment of the free bases with pharmaceutically acceptable salt forming inorganic or organic acids, such as hydrochloric acid, hydrobromic acid, sulfuric acid, phosphoric acid, acetic acid, benzoic acid, citric acid, fumaric acid, maleic acid and the like.

The tertiary alcohols used as starting materials an be prepared, for example, by converting a compound of the formula

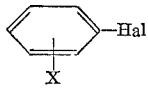

in which X has the same significance as above and Hal is a halogen atom which is more active than halogen atom X into a Grignard compound or a lithium compound and then reacting such compound with an N-alkyl-piperidone-(4).

The following examples will serve to illustrate the invention with reference to several embodiments thereof.

Example 1

63 g. of N-methyl-4-(m-chlorophenyl) - piperidol - (4) were dissolved in 630 g. of glacial acetic acid and 63 cc. of sulfuric acid were added thereto dropwise. The reaction mixture was then boiled under reflux for 5 minutes, cooled and poured on ice. The resulting mixture was rendered alkaline with Na₂CO₃ and extracted with ether. Upon evaporation of the ether from the extract, 53 g. of N-methyl-4-(m-chlorophenyl) - 1,2,3,6 - tetrahydropyridine were obtained. It was taken up in isopropanol and the hydrochloride thereof precipitated therefrom. The melting point of such hydrochloride was 220–224° C.

The piperidol starting material employed was prepared by converting m-chlorobromo benzene in ether with magnesium to the m-chlorophenyl magnesium bromide in a manner known per se and the latter reacted by dropwise addition of the equivalent quantity of N-methyl-piperidone-(4). After decomposition of the reaction product with aqueous ammonium chloride the ether layer was dried and distilled. N-methyl-4-(m-chlorophenyl)-piperidol-(4) distilled over as a light colored oil at 146°–150° C. under a pressure of 1 torr.

Example 2

13 g. of N-methyl-4-(m-chlorophenyl)-piperidol-(4) were dissolved in 100 g. of chloroform and 20 g. of thionyl chloride added thereto. After the mixture had been boiled under a reflux for 4 hours it was boiled down and the residue recrystallized from isopropanol. 7 g. of the hydrochloride of N-methyl-4-(m-chlorophenyl)-1,2,3,6-tetrahydropyridine with a melting point of 220°–224° C. were obtained.

Example 3

15 g. of N-methyl-4-(m-trifluoromethylphenyl)-piperidol-(4) were dissolved in 150 g. of chloroform. The solution was then saturated with gaseous HCl and after 23 g. of thionyl chloride were added thereto it was boiled under reflux for 4 hours. The reaction mixture was boiled down to dryness and the residue recrystallized from isopropanol. 8 g. of N-methyl-4-(m-trifluoromethylphenyl)-1,2,3,6-tetrahydropyridine hydrochloride with a melting point of 240°–245° C. were obtained. The starting material was prepared analogously to that of Example 1 starting with m-trifluoromethyl bromo benzene and N-methylpiperidone-(4).

We claim:
1. A compound selected from the group consisting of substituted phenyltetrahydropyridines of the formula

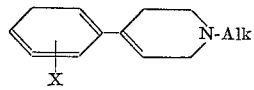

wherein X is selected from the group consisting of halogen atoms and trifluoromethyl and Alk is alkyl of 1 to 6 carbon atoms and its acid addition salts with pharmaceutically acceptable acids.

2. The acid addition salt of a compound of the formula

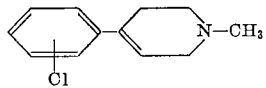

with a pharmaceutically acceptable acid.

3. The acid addition salt of N-methyl-4-(m-chlorophenyl)-1,2,3,6-tetrahydropyridine with a pharmaceutically acceptable acid.

References Cited by the Examiner

UNITED STATES PATENTS 2,748,140   5/1956   Schmidle et al. _____ 260—290
2,928,767   3/1960   Gulesch et al. _____ 165—52

OTHER REFERENCES

Schmidle et al.: J. Am. Chem. Society, volume 78 (1956), pages 425–428.
Chem. Abstracts, vol. 42, par. 3401–3403 (1948).
Chem. Abstracts, vol. 47, par. 4884g (1953).

WALTER A. MODANCE, *Primary Examiner.*
ALAN L. ROTMAN, *Assistant Examiner.*